UNITED STATES PATENT OFFICE.

JOHN B. BECK, OF PITTSBURG, PENNSYLVANIA, ASSIGNOR TO HIMSELF, AND AUGUSTIN HALLER AND AUGUSTIN MUNSCH, BOTH OF ALLEGHENY CITY, PENNSYLVANIA.

FERTILIZER.

SPECIFICATION forming part of Letters Patent No. 285,555, dated September 25, 1883.

Application filed May 4, 1883. (No specimens.)

*To all whom it may concern:*

Be it known that I, JOHN B. BECK, of Pittsburg, in the county of Allegheny and State of Pennsylvania, have invented a new and useful Improvement in Fertilizers; and I do hereby declare the following to be a full, clear, and exact description thereof.

My invention relates to an improvement in fertilizers; and it consists in a compound of bitter-salt, limestone, plaster, sulphate of sodium, sulphate of ammonium, and protoxide of potassium or potash, the purpose of which is to fertilize land and add to it such properties as are necessary and indispensable to the growth and proper nourishment of vegetation, also for the purpose of destroying injurious worms and insects.

I will now describe my invention, so that others skilled in the art may manufacture and use the same.

Bitter-salt is that salt produced from the latter part of the evaporation of salt-water in the manufacture of salt. A certain quantity of this salt (about forty-two parts) is mixed with about twenty-four parts of raw limestone ground to a fine powder or flour, about eighteen parts of ground plaster or gypsum, about eight parts of sulphate of soda, about six parts of protoxide of potassium or potash, and about two parts of sulphate of ammonium in crystals. These ingredients are thoroughly mixed by being passed together through a sieve or screen.

This fertilizer is well adapted for use on all kinds of land and for all kinds of crops. The proportions of the ingredients used, however, may be slightly varied, according to the wants of the soil. For some lands a certain quantity of magnesia may be added to the foregoing ingredients.

This fertilizer should be used by sowing it broadcast over the surface of the soil, and then plowing it under before planting and sowing, as it is thereby more readily absorbed by the soil, and nourishment is imparted to the grain or plants through their roots. It is also thereby made more effectual in destroying worms and insects under the surface of the ground.

Having thus described my invention, what I claim, and desire to secure by Letters Patent, is—

A fertilizer composed of bitter-salt, limestone, plaster, sulphate of sodium, sulphate of ammonium, and potash, substantially as and for the purposes described.

In testimony whereof I have hereunto set my hand this 27th day of April, A. D. 1883.

JOHN B. BECK.

Witnesses:
W. B. CORWIN,
JAMES K. BAKEWELL.